United States Patent
Wang et al.

(10) Patent No.: US 10,991,287 B2
(45) Date of Patent: Apr. 27, 2021

(54) ARRAY SUBSTRATE AND DISPLAY DEVICE

(71) Applicants: BOE TECHNOLOGY GROUP CO., LTD., Beijing (CN); CHONGQING BOE OPTOELECTRONICS TECHNOLOGY CO., LTD., Chongqing (CN)

(72) Inventors: Zhihui Wang, Beijing (CN); Shuai Chen, Beijing (CN)

(73) Assignees: BOE TECHNOLOGY GROUP CO., LTD., Beijing (CN); CHONGQING BOE OPTOELECTRONICS TECHNOLOGY CO., LTD., Chongqing (CN)

( * ) Notice: Subject to any disclaimer, the term of this patent is extended or adjusted under 35 U.S.C. 154(b) by 223 days.

(21) Appl. No.: 16/099,904

(22) PCT Filed: Mar. 1, 2018

(86) PCT No.: PCT/CN2018/077736
§ 371 (c)(1),
(2) Date: Nov. 8, 2018

(87) PCT Pub. No.: WO2019/007087
PCT Pub. Date: Jan. 10, 2019

(65) Prior Publication Data
US 2020/0349876 A1 Nov. 5, 2020

(30) Foreign Application Priority Data
Jul. 3, 2017 (CN) .......................... 201720796035.X

(51) Int. Cl.
*G09G 3/20* (2006.01)
(52) U.S. Cl.
CPC ....... *G09G 3/20* (2013.01); *G09G 2310/0267* (2013.01); *G09G 2320/02* (2013.01)

(58) Field of Classification Search
CPC ............. G09G 3/20; G09G 2310/0267; G09G 2320/02
See application file for complete search history.

(56) References Cited

U.S. PATENT DOCUMENTS

2005/0286004 A1    12/2005  Lee
2013/0321362 A1*   12/2013  Zheng .................. G02F 1/1345
                                                      345/204
(Continued)

FOREIGN PATENT DOCUMENTS

CN    102682694    9/2012
CN    102855861    1/2013
(Continued)

OTHER PUBLICATIONS

International Search Report and Written Opinion of the International Searching Authority corresponding to International Patent Application No. PCT/CN2018/077736 dated May 21, 2018. (16 pages with English translation).

(Continued)

*Primary Examiner* — Peter D McLoone
(74) *Attorney, Agent, or Firm* — Myers Bigel, P.A.

(57) ABSTRACT

The present disclosure provides an array substrate including at least two groups of gate lines, each group of gate lines including at least one gate line, and at least two gate driving circuits each corresponding to a group of gate lines. For any two gate driving circuits different in distance from the driving chip, any signal output line to which a gate driving circuit farther from the driving chip is connected has a resistance smaller than that of any signal output line to which a gate driving circuit closer to the driving chip is connected.

20 Claims, 1 Drawing Sheet

(56) References Cited

U.S. PATENT DOCUMENTS

2013/0321478 A1  12/2013  Zheng et al.
2014/0085173 A1   3/2014  Dong et al.
2018/0224700 A1   8/2018  Yue et al.

FOREIGN PATENT DOCUMENTS

CN    106205540 A    12/2016
CN    206848661       1/2018

OTHER PUBLICATIONS

Extended European Search Report corresponding to EP Patent Application 18803309.6; dated Jan. 15, 2021 (14 pages).

* cited by examiner

ARRAY SUBSTRATE AND DISPLAY DEVICE

CROSS REFERENCE TO RELATED APPLICATIONS

The present application is a 35 U.S.C. 371 national stage application of PCT International Application No. PCT/CN2018/077736, filed on Mar. 1, 2018, which claims the benefit of Chinese patent application No. 201720796035.X, filed on Jul. 3, 2017, the contents of which are incorporated herein by reference in their entireties.

FIELD

The present disclosure relates to the field of display technologies, and specifically to an array substrate and a display device.

BACKGROUND

In a display device, a gate driving circuit is used for providing a scan signal to multiple rows of gate lines connected thereto row by row, thereby enabling display. Due to the limited driving capability of the gate driving circuit, a plurality of gate driving circuits are usually disposed, and each gate driving circuit is connected to a group of gate lines. The gate driving circuit receives a turn-on signal provided by a driving chip through a signal input line, and further outputs the turn-on signal to the gate line. However, since different gate driving circuits are at different distances from the driving circuit and the signal input line has a large resistance, turn-on signals received by input terminals of different gate driving circuits have different voltages, so that turn-on signals outputted by different gate driving circuits have different voltages, resulting in a phenomenon that different regions are different in display quality (split-screen phenomenon).

SUMMARY

The present disclosure provides an array substrate comprising: at least two groups of gate lines, each group of gate lines including at least one gate line; and at least two gate driving circuits each corresponding to one group of gate lines, wherein each gate driving circuit includes an input terminal and at least one output terminal, the at least one output terminal of each gate driving circuit is connected to at least one gate line in a respective group in one-to-one correspondence through a signal output line, and input terminals of the at least two gate driving circuits are connected to a same driving chip; wherein for any two gate driving circuits different in distance from the driving chip, any signal output line to which a gate driving circuit farther from the driving chip is connected has a resistance smaller than that of any signal output line to which a gate driving circuit closer to the driving chip is connected.

Optionally, all signal output lines are identical in length and resistivity, and for any two gate driving circuits different in distance from the driving chip, any signal output line to which a gate driving circuit farther from the driving chip is connected has a sectional area larger than that of any signal output line to which a gate driving circuit closer to the driving chip is connected; wherein a section of the signal output line is a section perpendicular to a lengthwise direction of the signal output line.

Optionally, all the signal output lines have a same thickness, and for any two gate driving circuits different in distance from the driving chip, any signal output line to which a gate driving circuit farther from the driving chip is connected has a width larger than that of any signal output line to which a gate driving circuit closer to the driving chip is connected.

Optionally, all the signal output lines are identical in length and sectional area, and for any two gate driving circuits different in distance from the driving chip, any signal output line to which a gate driving circuit farther from the driving chip is connected has a resistivity smaller than that of any signal output line to which a gate driving circuit closer to the driving chip is connected.

Optionally, all the signal output lines are identical in resistivity and sectional area, and for any two gate driving circuits different in distance from the driving chip, any signal output line to which a gate driving circuit farther from the driving chip has a length smaller than that of any signal output line to which a gate driving circuit closer to the driving chip is connected.

Optionally, a plurality of signal output lines to which a same gate driving circuit is connected have a same resistance.

Optionally, the at least two groups of gate lines are located in a display area of the array substrate, and all the gate driving circuits are arranged in a column and disposed on a same side of the display area; or, all the gate driving circuits are arranged in two columns, each column including at least two gate driving circuits, and two columns of gate driving circuits are disposed on two opposite sides of the display area respectively.

Optionally, the array substrate further comprises at least one signal input line for connecting the driving chip to input terminals of all the gate driving circuits.

Optionally, the number of the signal input lines is the same as the number of columns of the gate driving circuits, and each column of gate driving circuits corresponds to one signal input line; wherein input terminals of the gate driving circuits in a same column are connected to different positions on a respective signal input line, respectively.

Optionally, for any two gate driving circuits in the same column, a resistance R1 between connection positions on the signal input line connected to the two gate driving circuits, a resistance R2 of any signal output line to which a gate driving circuit closer to the driving chip is connected, and a resistance R3 of any signal output line to which a gate driving circuit farther from the driving chip is connected satisfy: R2=R1+R3.

Accordingly, the present disclosure further provides a display device comprising any of the array substrates described above and a driving circuit board disposed on one side of the array substrate, wherein the driving circuit board is provided with a driving chip, and an input terminal of each gate driving circuit is connected to an output terminal of the driving chip.

Optionally, the output terminal of the driving chip is a high level output terminal.

BRIEF DESCRIPTION OF THE DRAWINGS

The drawings are provided below to provide a further understanding of the present disclosure and constitute a part of the specification, but are not intended to limit the present disclosure. In the drawings.

DETAILED DESCRIPTION

Figure 1:
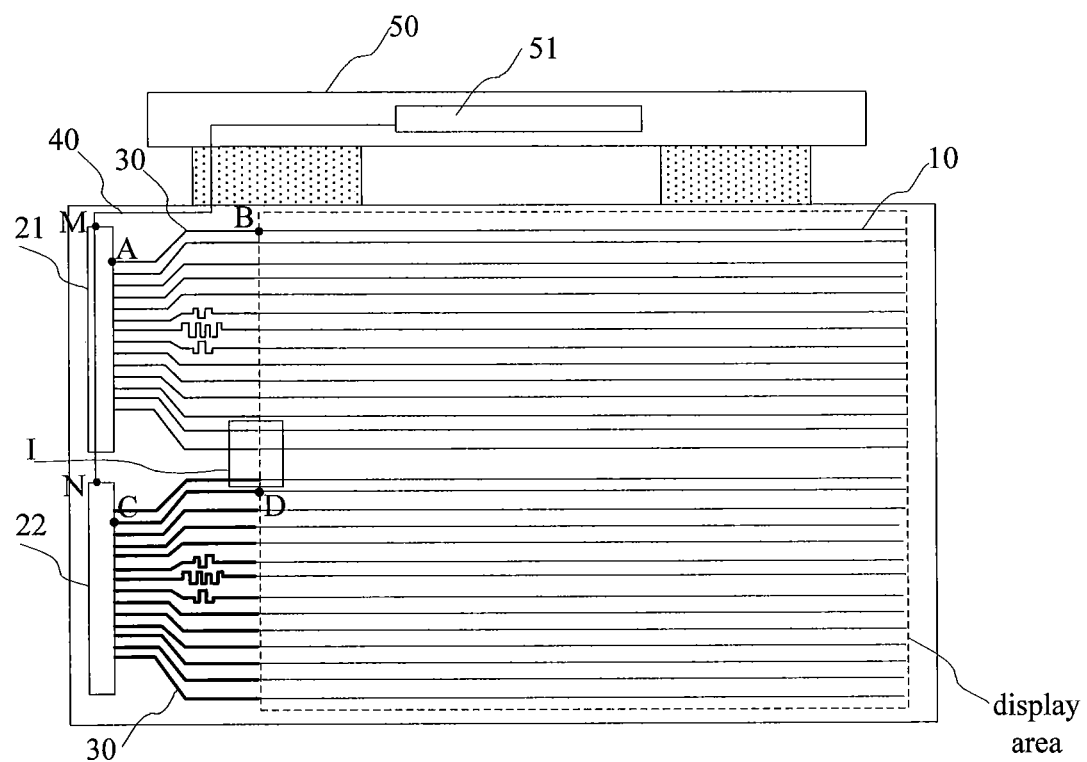
FIG. 1 is a schematic diagram illustrating an array substrate and a driving circuit board provided by the present disclosure.

Reference numerals are listed as: 10—gate line; 21, 22—gate driving circuit; 30—signal output line; 40—signal input line; 50—driving circuit board; 51—driving chip.

Specific embodiments of the present disclosure will be described in detail below with reference to the accompanying drawings. It is to be understood that the specific embodiments described herein are only used for illustrating and explaining the present disclosure, rather than limiting it.

According to an an embodiment of the present disclosure, there is provided an array substrate, as shown in FIG. 1. The array substrate comprises at least two groups of gate lines 10 and at least two gate driving circuits (such as 21 and 22 in FIG. 1), wherein the array substrate comprises a display area and a non-display area located around the display area. The gate lines 10 are disposed in the display area of the array substrate, and the gate driving circuits are disposed in the non-display area. Each group of gate lines 10 includes at least one gate line 10 (a plurality of gate lines are shown in FIG. 1), and each gate driving circuit 21, 22 corresponds to one group of gate lines 10. Each gate driving circuit 21, 22 includes an input terminal and at least one output terminal (a plurality of output terminals are shown in FIG. 1). As shown in FIG. 1, the plurality of output terminals of the two gate driving circuits 21, 22 are connected to a plurality of gate lines in a respective group in one-to-one correspondence through signal output lines 30. The input terminals of the gate driving circuits are used to be connected to the same driving chip 51. For any two gate driving circuits different in distance from the driving chip 51, for example, the gate driving circuits 21 and 22 in FIG. 1, any signal output line 30 to which the gate driving circuit 22 farther from the driving chip 51 is connected has a smaller resistance than that of any signal output line 30 to which the gate driving circuit 21 closer to the driving chip 51 is connected.

Each gate driving circuit 21, 22 may include a plurality of cascaded shift register units, each of which is connected to a gate line such that the gate driving circuit 21, 22 outputs a turn-on signal sequentially. The input terminal of the gate driving circuit 21, 22 receives a turn-on signal provided by the driving chip 51 through a wire, so that each shift register unit outputs the turn-on signal to a respective gate line 10 at its output phase.

As the distance to the driving chip 51 increases, the wire between the input terminal of the gate driving circuit 21, 22 and the driving chip 51 becomes longer, and the resistance of the wire becomes larger, so that attenuation of the signal received by the gate driving circuit 21, 22 increases, and attenuation of the signal outputted by the output terminal of the gate driving circuit 21, 22 thus increases. In the present disclosure, attenuation of the signal received by the input terminal of the gate driving circuit 21, 22 increases as the distance to the driving chip 51 increases, but the resistance of the signal output line 30 between the output terminal of the gate driving circuit 21, 22 and the gate line 10 decreases, so that attenuation of the signal on the signal output line 30 decreases, which in turn reduces the differences between signals received by different groups of gate lines, improving the split-screen phenomenon.

Embodiments of the present disclosure will be specifically described below with reference to FIG. 1. The array substrate in FIG. 1 comprises two gate driving circuits 21 and 22. The array substrate further comprises a signal input line 40 for connecting the driving chip 51 to the input terminal of the gate driving circuit. Each gate driving circuit 21, 22 may be connected to the driving chip through a separate signal input line, or a plurality of gate driving circuits 21 and 22 may be connected to the driving chip by sharing the same signal input line.

Optionally, a plurality of signal output lines 30 to which the same gate driving circuit 21, 22 is connected have the same resistance to ensure that the same group of gate lines 10 receive the same signal.

As an example, all of the signal output lines 30 have the same length, and also have the same resistivity. In this case, the plurality of signal output lines 30 to which the same gate driving circuit 21, 22 is connected have the same sectional area in a direction perpendicular to the lengthwise direction. For any two gate driving circuits 21 and 22 different in distance from the driving chip 51, any signal output line 30 to which the gate driving circuit 22 farther from the driving chip 51 is connected has a larger sectional area than that of any signal output line 30 to which the gate driving circuit 21 closer to the driving chip 51 is connected, so that the signal output line 30 to which the gate driving circuit 22 farther from the driving chip 51 is connected has a smaller resistance. The section of the signal output line 30 is a section perpendicular to the lengthwise direction of the signal output line 30.

Figure 2:
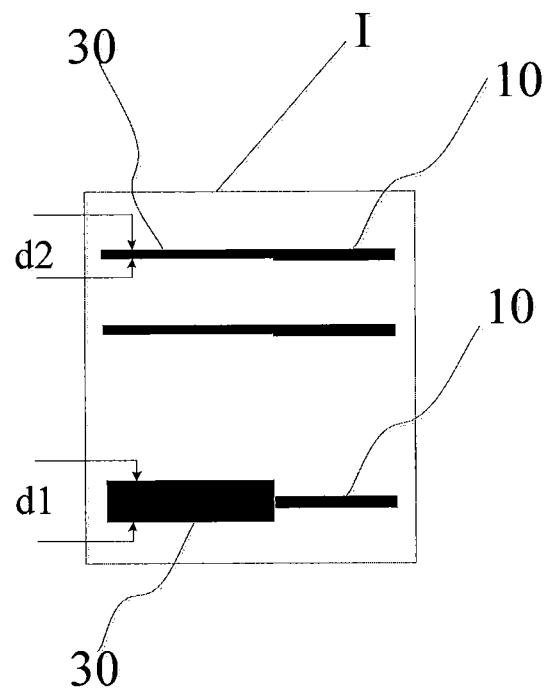
FIG. 2 is an enlarged schematic view of an area I of FIG. 1.

As another example, all of the signal output lines 30 may have the same thickness. In this case, for any two gate driving circuits 21 and 22 different in distance from the driving chip 51, any signal output line 30 to which the gate driving circuit 22 farther from the driving chip 51 is connected has a larger width than that of any signal output line 30 to which the gate driving circuit 21 closer to the driving chip 51 is connected. As shown in FIG. 2 which is an enlarged schematic view of an area I in FIG. 1, a width d1 of any signal output line 30 to which the gate driving circuit 22 farther from the driving chip 51 is connected is larger than a width d2 of any signal output line 30 to which the gate driving circuit 21 closer to the driving chip 51 is connected.

It is to be noted that, in embodiments of the present disclosure, the lengths and the resistivities of the signal output lines 30 are set to be identical, and the resistances thereof are different by setting the sectional areas of the signal output lines 30 to which different gate driving circuits are connected. Of course, it is also possible to set the lengths and the sectional areas of all the signal output lines 30 to be identical, and make the resistances of the signal output lines to which different gate driving circuits are connected different by controlling the resistivities thereof; or set the resistivities and the sectional areas of all the signal output lines 30 to be identical, and make the resistances of the signal output lines to which different gate driving circuits are connected different by controlling the lengths thereof.

As shown in FIG. 1, all the gate driving circuits 21 and 22 are arranged in a column and disposed on the same side of the display area. Alternatively, all the gate driving circuits are arranged in two columns, each column including at least two gate driving circuits, and the two columns of gate driving circuits are disposed on two opposite sides of the display area respectively. When the gate driving circuits are arranged in two columns, each group of gate lines may be connected to the left and right gate driving circuits simultaneously for bilateral driving so as to decrease attenuation of signals on the gate lines 10, thereby reducing the differences between signals received by different pixel units.

In embodiments, the number of signal input lines 40 may be the same as the number of columns of gate driving circuits, wherein each column of gate driving circuits corresponds to one signal input line, and the input terminals of the gate driving circuits in the same column are connected to different positions on a respective signal input line 40. As shown in FIG. 1, the gate driving circuits 21 and 22 are arranged in a row, and the number of signal input line 40 is one, wherein the two gate driving circuits 21 and 22 are connected to points M and N on the signal input line 40 respectively. This can prevent excessive signal input lines 40 from occupying space, thereby reducing the width of the bezel.

Alternatively, for any two gate driving circuits 21 and 22 in the same column, a resistance R1 between the connection positions on the signal input line 40 connected to the two gate driving circuits 21 and 22 respectively, a resistance R2 of any signal output line 30 to which the gate driving circuit 21 closer to the driving chip 51 is connected, and a resistance R3 of any signal output line 30 to which the gate driving circuit 22 farther from the driving chip 51 is connected satisfy: R2=R1+R3. For the arrangement of FIG. 1, R1 is a resistance of the signal input line 40 between point M and point N, R2 is a resistance of the signal output line 30 between point A and point B, and R3 is a resistance of the signal output line 30 between point C and point D. Such an arrangement causes the resistances of the signal lines between the driving chip 51 and different groups of gate lines 10 to be the same, so that signals received by different groups of gate lines 10 have equal voltages, which in turn enables different regions of the display panel to display images of the same quality.

Another embodiment of the present disclosure provides a display device including the array substrate described above and a driving circuit board 50 disposed on one side of the array substrate. As shown in FIG. 1, the driving circuit board 50 is provided with a driving chip 51, and an input terminal of each gate driving circuit 21, 22 is connected to an output terminal of the driving chip 51. The output terminal of the driving chip 51 is for outputting a turn-on signal that turns on a thin film transistor in a pixel unit of the array substrate. As an example, the thin film transistor may be an N-type transistor, and accordingly, the output terminal of the driving chip 51 is a high level output terminal. It is to be noted that the high level is in contrast to a low level and is usually a level greater than or equal to 5V, but the numerical value thereof is not specifically limited.

The display device may be any product or component having a display function, such as an electronic paper, an OLED panel, a mobile phone, a tablet computer, a television, a display, a notebook computer, a digital photo frame, a navigator, and the like.

Since the differences between signals received by different groups of gate lines can be reduced by adjusting the resistances of the signal output lines in the array substrate, the split-screen phenomenon of the display device including the array substrate is reduced, and the display effect is enhanced.

It can be understood that the above embodiments are exemplary embodiments used only for illustrating the principle of the present disclosure, and that the present disclosure is not so limited. Various variations and improvements may be made by those ordinarily skilled in the art without departing from the spirit and essence of the present disclosure. These variations and improvements are regarded as falling within the scope of the present disclosure.

The invention claimed is:

1. An array substrate comprising:
at least two groups of gate lines, ones of the at least two groups of gate lines comprising at least one gate line; and
at least two gate driving circuits corresponding to respective ones of the at least two groups of gate lines,
wherein ones of the gate driving circuits comprise an input terminal and at least one output terminal,
wherein the at least one output terminal of the ones of the gate driving circuits is connected to the at least one gate line in a respective group in one-to-one correspondence through respective signal output lines,
wherein a first input terminal of a first gate driving circuit of the at least two gate driving circuits and a second input terminal of a second gate driving circuit of the at least two gate driving circuits are connected to a same driving chip,
wherein when a first gate driving circuit that is a first distance from the driving chip that is different from a second distance of the second gate driving circuit from the driving chip, a first signal output line of the first gate driving circuit connected to the driving chip has a first resistance that is smaller than a second resistance of a second signal output line of the second gate driving circuit that is closer to the driving chip, and
wherein a plurality of signal output lines that are connected to a same gate driving circuit have a same length.

2. The array substrate according to claim 1,
wherein the first signal output line and the second signal output line are substantially identical in length and resistivity, and
wherein when a first gate driving circuit that is a first distance from the driving chip that is different from a second distance of the second gate driving circuit from the driving chip, a first signal output line of the first gate driving circuit connected to the driving chip has a first sectional area that is larger than a second sectional area of the second signal output line of the second gate driving circuit that is closer to the driving chip, and
wherein a first section of the first signal output line is perpendicular to a lengthwise direction of a second section of the first signal output line.

3. The array substrate according to claim 2,
wherein the first signal output line and the second signal output line have about a same thickness, and
wherein when a first gate driving circuit that is a first distance from the driving chip that is different from a second distance of the second gate driving circuit from the driving chip, a first signal output line of the first gate driving circuit connected to the driving chip has a first width that is larger than a second width of the second signal output line of the second gate driving circuit that is closer to the driving chip.

4. The array substrate according to claim 1,
wherein the first signal output line and the second signal output line are substantially identical in length and sectional area, and
wherein when a first gate driving circuit that is a first distance from the driving chip that is different from a second distance of the second gate driving circuit from the driving chip, a first signal output line of the first gate driving circuit connected to the driving chip has a first resistivity that is smaller than a second resistivity of the second signal output line of the second gate driving circuit that is closer to the driving chip.

5. The array substrate according to claim 1,
wherein the first signal output line and the second signal output line are substantially identical in resistivity and sectional area, and
wherein when a first gate driving circuit that is a first distance from the driving chip that is different from a second distance of the second gate driving circuit from the driving chip, a first signal output line of the first gate driving circuit connected to the driving chip has a first length that is smaller than a second length of the second signal output line of the second gate driving circuit that is closer to the driving chip.

6. The array substrate according to claim 1, wherein a plurality of signal output lines to which a same gate driving circuit is connected have about a same resistance.

7. The array substrate according to claim 1,
wherein the at least two groups of gate lines are in a display area of the array substrate, and
wherein the ones of the gate driving circuits are arranged in a column and are on a same side of the display area.

8. The array substrate according to claim 7, wherein the array substrate further comprises:
at least one signal input line configured to connect the driving chip to respective input terminals of the ones of the gate driving circuits.

9. The array substrate according to claim 8,
wherein a number of the at least one signal input line is a same number as a number of columns of the at least two gate driving circuits,
wherein each column of the at least two gate driving circuits corresponds to a respective one of the at least one signal input line, and
wherein respective input terminals of ones of the at least two gate driving circuits in a same column are connected to different positions on a respective signal input line.

10. The array substrate according to claim 9,
wherein for the ones of the at least two gate driving circuits in the same column, a resistance R1 between connection positions on the respective signal input line connected to the ones of the at least two gate driving circuits, a resistance R2 of the respective signal output line to which a first gate driving circuit closer to the driving chip is connected, and a resistance R3 of the respective signal output line to which a second gate driving circuit farther from the driving chip is connected satisfy: R2=R1+R3.

11. The array substrate according to claim 1,
wherein the at least two groups of gate lines are in a display area of the array substrate, and
wherein the ones of the gate driving circuits are arranged in two columns, each column of the two columns comprising two or more of the at least two gate driving circuits, and
wherein the two columns of the gate driving circuits are on opposite sides of the display area respectively.

12. The array substrate according to claim 11, wherein the array substrate further comprises:
at least one signal input line configured to connect the driving chip to respective input terminals of the ones of the gate driving circuits.

13. A display device comprising:
the array substrate according to claim 1; and
a driving circuit board on a first side of the array substrate,
wherein the driving circuit board is provided with a driving chip, and
wherein respective input terminals of ones of the gate driving circuits are connected to an output terminal of the driving chip.

14. The display device according to claim 13, wherein the output terminal of the driving chip comprises a high level output terminal.

15. The display device according to claim 13,
wherein the first signal output line and the second signal output line are substantially identical in length and resistivity, and
wherein when a first gate driving circuit that is a first distance from the driving chip that is different from a second distance of the second gate driving circuit from the driving chip, a first signal output line of the first gate driving circuit connected to the driving chip has a first sectional area that is larger than a second sectional area of the second signal output line of the second gate driving circuit that is closer to the driving chip, and
wherein a first section of the first signal output line is perpendicular to a lengthwise direction of a second section of the first signal output line.

16. The display device according to claim 15,
wherein the first signal output line and the second signal output line have about a same thickness, and
wherein when a first gate driving circuit that is a first distance from the driving chip that is different from a second distance of the second gate driving circuit from the driving chip, a first signal output line of the first gate driving circuit connected to the driving chip has a first width that is larger than a second width of the second signal output line of the second gate driving circuit that is closer to the driving chip.

17. The display device according to claim 13,
wherein the first signal output line and the second signal output line are substantially identical in length and sectional area, and
wherein when a first gate driving circuit that is a first distance from the driving chip that is different from a second distance of the second gate driving circuit from the driving chip, a first signal output line of the first gate driving circuit connected to the driving chip has a first resistivity that is smaller than a second resistivity of the second signal output line of the second gate driving circuit that is closer to the driving chip.

18. The display device according to claim 13,
wherein the first signal output line and the second signal output line are substantially identical in resistivity and sectional area, and
wherein when a first gate driving circuit that is a first distance from the driving chip that is different from a second distance of the second gate driving circuit from the driving chip, a first signal output line of the first gate driving circuit connected to the driving chip has a first length that is smaller than a second length of the second signal output line of the second gate driving circuit that is closer to the driving chip.

19. The display device according to claim 13, wherein a plurality of signal output lines to which a same gate driving circuit is connected have about a same resistance.

20. The display device according to claim 13,
wherein the at least two groups of gate lines are in a display area of the array substrate, and
wherein the ones of the gate driving circuits are arranged in a column and are on a same side of the display area.

* * * * *